United States Patent

[11] 3,618,728

| [72] | Inventor | John C. McPherson |
| | | Philadelphia, Pa. |
| [21] | Appl. No. | 877,117 |
| [22] | Filed | Nov. 17, 1969 |
| [45] | Patented | Nov. 9, 1971 |
| [73] | Assignee | Eaton Yale & Towne Inc. |
| | | Cleveland, Ohio |

[54] REVERSING CLUTCHES WITH FLUID FLOW CONTROLS
3 Claims, 6 Drawing Figs.

[52] U.S. Cl. ............................................. 192/87.19, 192/51, 192/109 F, 37/625.69
[51] Int. Cl. ............................................. F16d 25/10
[50] Field of Search ............................................. 192/109 F, 51, 87.17, 87.18, 87.19

[56] References Cited
UNITED STATES PATENTS

| 2,461,218 | 2/1949 | Lapsley | 192/109 F X |
| 2,632,544 | 3/1953 | Hockert | 192/87.17 |
| 2,907,428 | 10/1959 | Erwin et al. | 192/109 F X |
| 2,990,928 | 7/1961 | King | 192/87.19 |
| 3,042,165 | 7/1962 | Yokel | 192/109 F X |
| 3,527,328 | 9/1970 | Maurice | 192/87.19 X |

*Primary Examiner*—Benjamin W. Wyche
*Attorney*—Teagno & Toddy

ABSTRACT: In a hydraulic transmission, a dampener such as an accumulator is placed in the passages transmitting hydraulic fluid pressure to the transmission clutches in order to prevent the sudden engagement of the clutches. In a modification, the dampener is a bypass between the passages transmitting fluid pressure to the clutches, so that the dissipation of fluid pressure through the bypass prevents sudden engagement of the clutches. In a further modification the bypass is formed in a gasket for a valve body in which there are openings for each of the passages in the valves body conveying fluid pressure to the clutches. The cutting away of a part of the gasket actually forms the bypass.

INVENTOR.
John C. McPherson

ATTORNEY.

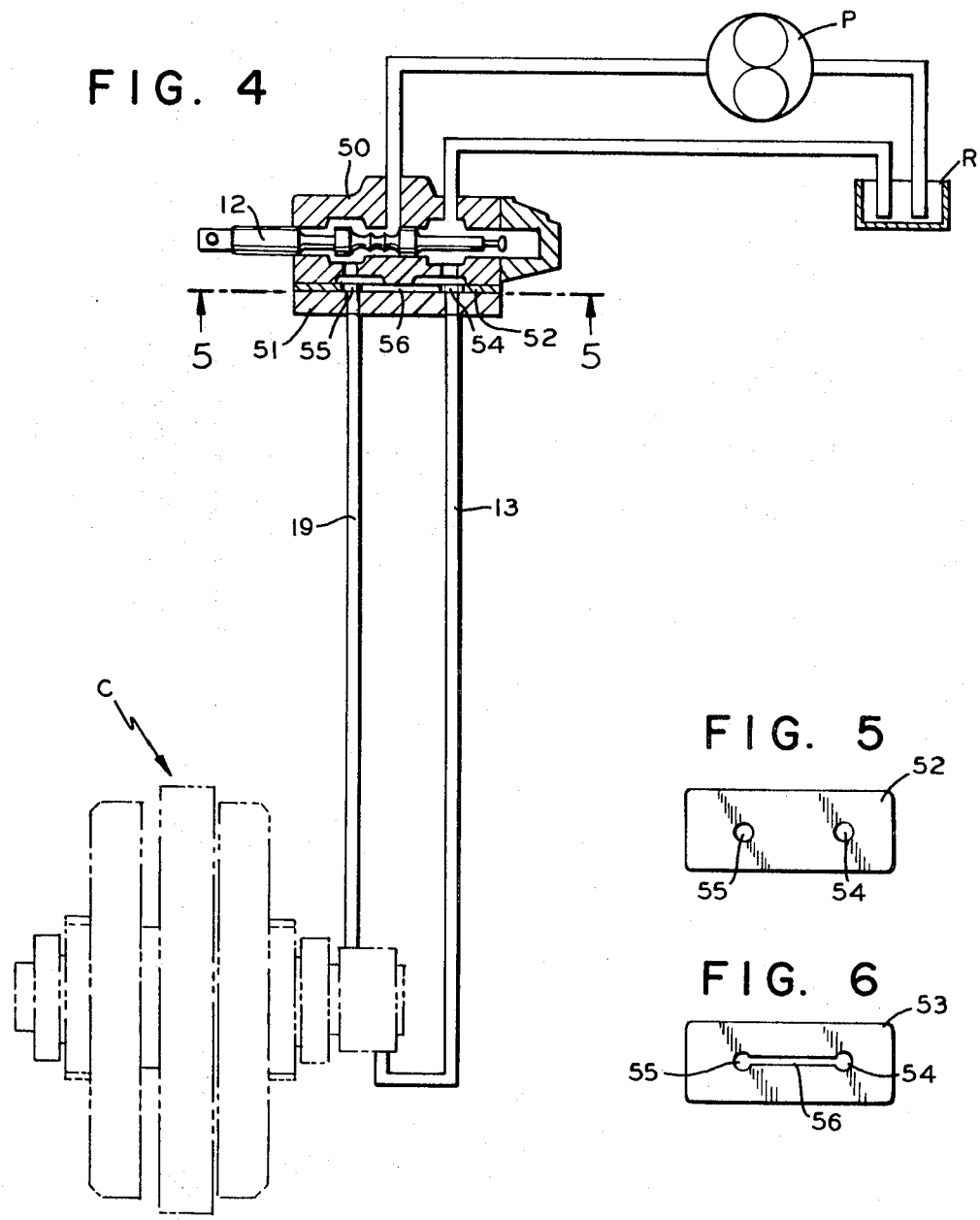

3,618,728

REVERSING CLUTCHES WITH FLUID FLOW CONTROLS

BACKGROUND OF THE INVENTION

This invention relates to a hydraulic transmission, and more particularly, to means for controlling the application of hydraulic pressure to the clutches of a hydraulic transmission. As those skilled in the art will appreciate, it is very important in the operation of a vehicle such as an industrial truck, that all starts be smooth and with relatively slow acceleration. If the operator runs his traction engine at a high rate of speed, and simultaneously engages the directional clutch to drive forward or rearward, the truck will move from a standing position at relatively high speed and with extremely uneven motion. Obviously, this may damage the truck, the load on the truck, and may even cause the operator to be thrown from his position on the truck. It is the purpose of my invention to prevent the swift application of fluid to the directional clutches of a hydraulic transmission, and therefore to prevent extremely fast acceleration and uneven starts.

PRIOR ART

In a construction that I have conceived, and which is covered in a pending application Ser. No. 877,744 dated Nov. 18, 1969, I disclose means for preventing the swift application of hydraulic fluid to the clutches of a hydraulic transmission. In the construction shown in the application, as an additional feature, all pressure to the clutches is automatically dissipated when the directional valve of the transmission is placed in neutral position. Thereafter, if the directional valve is moved to forward or rearward drive position, fluid will be applied to the clutches at a measured graduated rate, so as to prevent uneven motion and extremely swift acceleration. While the construction disclosed by me in the said patent application is very effective, it does require the addition to the transmission of a novel control mechanism for the clutches. My invention here to be disclosed has the advantage that it may be applied to a standard clutch construction with but very little modification, and yet will contribute certain excellent results similar to those inherent in my earlier invention.

SUMMARY OF INVENTION

In this application I shall show three modifications embodying the concept of my invention. In one modification, I contribute a bypass passage between the fluid-carrying pipe in which hydraulic fluid flows to one of the directional clutches, and the pipe through which fluid flows to the other directional clutch. It is also possible to place the bypass so that fluid will flow directly to the low pressure side of the hydraulic system. Obviously, therefore, when fluid is applied under pressure to either of the directional clutches, some of the fluid will be dissipated through the bypass passage. This therefore, will prevent the swift application of fluid pressure to the clutches. Actually, effective pressure will be applied to the clutches only after the engine develops sufficient speed to overcome the dissipation of pressure by the bypass.

As a further feature of this modification, I provide a control valve that will eventually move into a position to prevent dissipation of fluid pressure after the engine speed develops to a particular degree, all as will be made quite clear.

In a second modification of the invention, I provide at each passage through which fluid flows to the directional clutches, a dampening means in the form of an accumulator. Therefore, any application of fluid pressure to either of the passages, will be controlled by the accumulators, which will act as a means for dissipating some of the pressure. Obviously, an accumulator can easily be added to a standard transmission.

In the third modification of my invention, I utilize a gasket between two parts of a valve body through which fluid flows to the two passages connected to the two directional clutches. I take the gasket that is positioned between the two parts of the valve body, and I cut an opening in that gasket in a position to allow dissipation of fluid through the opening from one passage to the other. In effect, I will obtain in this modification the same dissipation of pressure that it is possible to obtain in the first modification here outlined, except that there will be no provision in the relatively simple structure that I have devised, for eventually preventing any dissipation of fluid. It is obviously extremely simple to add the advantages of my invention to an existing prior art structure, through use of this modification.

DESCRIPTION OF DRAWINGS

Referring now to the drawings;

FIG. 4 is a diagrammatic view of the third modification of my invention in which fluid is dissipated through the utilization of a gasket that is placed between the two passages leading to the clutches.

FIG. 5 is a section taken along line 5—5 of FIG. 4 showing the gasket before it is cut in order to operate as required in accordance with my invention.

FIG. 6 shows the gasket of FIG. 5 after it has been cut.

DESCRIPTION OF MODIFICATIONS OF THE INVENTION

Figure 1:
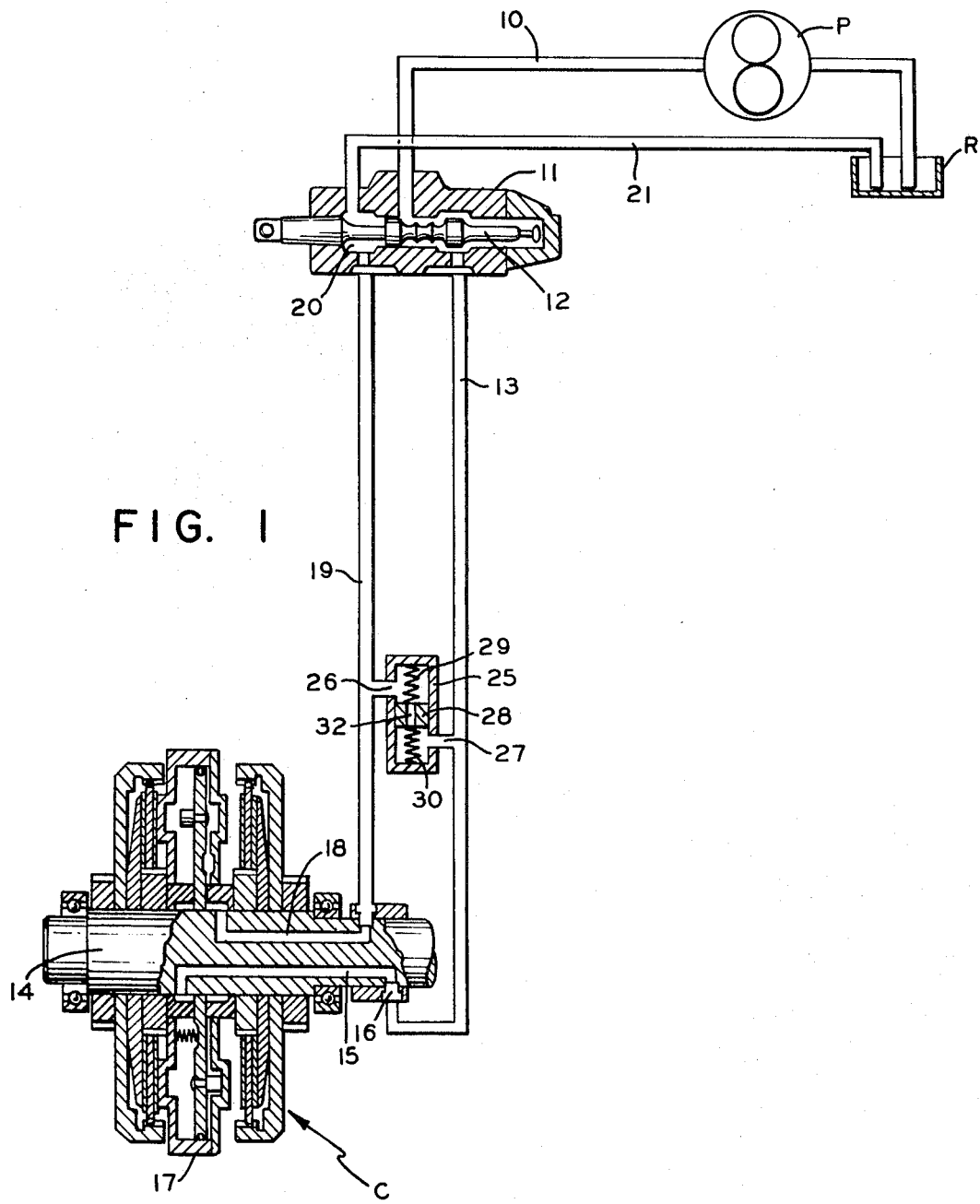
FIG. 1 is a diagrammatic illustration of the first modification of my invention utilizing a bypass passage.
Figure 2:
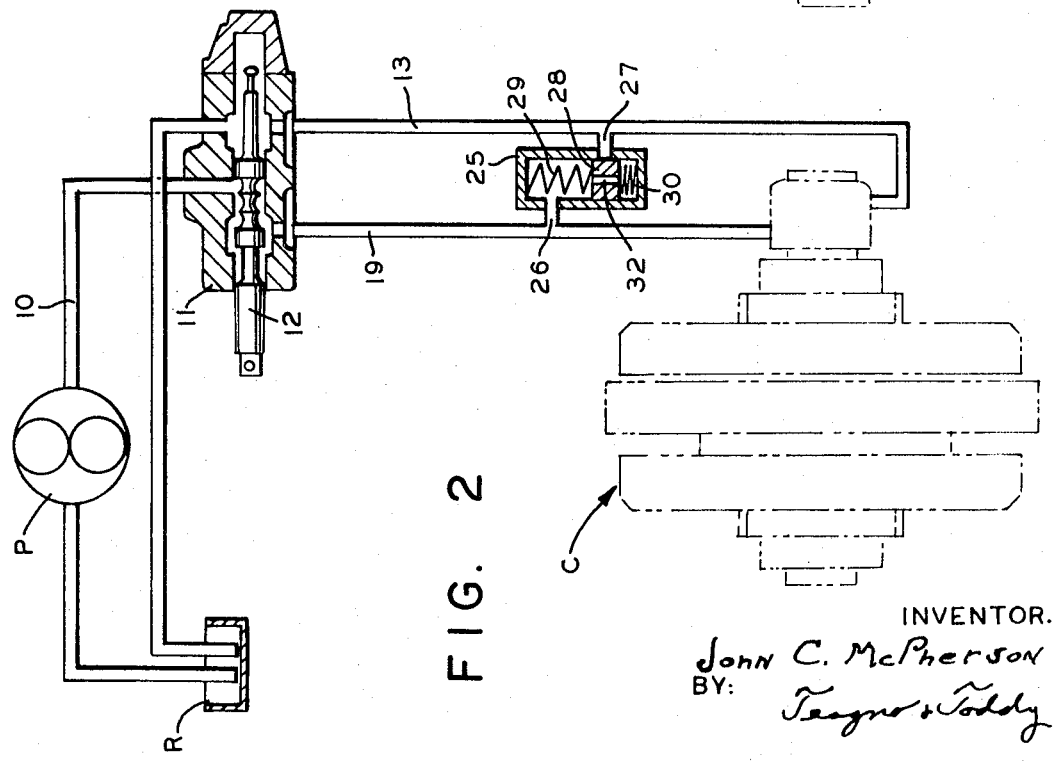
FIG. 2 is a view similar to FIG. 1 but showing the direction of fluid flow reversed and a shuttle valve in the bypass passage moved to a position to prevent further dissipation of fluid.

Referring now more particularly to the drawings, and especially FIGS. 1 and 2, the letter P refers to the pump of the hydraulic transmission driven by the engine and receiving its fluid from a reservoir R. This fluid will flow through a pipe 10 into a valve body 11 in which moves a standard directional spool 12. In the position of the parts in FIG. 1, the directional spool 12 is positioned so that fluid will flow from the passage 10 past the spool 12 and into the further passage 13 toward the clutch of the transmission designated generally by the reference letter C. Since the clutch per se is not a part of my invention, I shall refer only to those parts thereof that facilitate an explanation of the operation of the invention.

Thus, the clutch C has a rotating shaft 14 having a passage 15 that is at all times in communication through a port 16 with the pipe 13. When hydraulic fluid under pressure is applied through the pipe 13 it will flow into the passage 15 and will move the part 17 of the clutch to the left into a forward directional position. The shaft 14 is also formed with a passage 18 that is at all times in communication with a pipe 19 that communicates at its upper end with passages in the valve body 11. Obviously, if fluid under pressure is transmitted through the pipe 19 toward the clutch C, it will move through the passage 18 and move the part 17 of the clutch assembly to the right. Movement of part 17 to the right or left effects driving engagements of the clutch plates in a standard manner.

When the valve spool 12 is in its position of FIG. 1 directing fluid under pressure through the pipe 13 to the clutch C, the pipe 19 will connect the passage 18 of the clutch with the chamber 20 of the valve body 11, that is in turn connected by a pipe 21 with the reservoir R.

My invention contemplates the utilization of a bypass valve body 25 positioned preferably between the two pipes 13 and 19. This valve body communicates through a passage 26 with the pipe 19 and a passage 27 with the pipe 13. Preferably, the valve body 25 contains a sliding shuttle valve 28 maintained in a central position by a spring 29 at the one side and a spring 30 at the other side. The shuttle valve 28 is formed with a central passage 32 for an important purpose. With the parts in the position of FIG. 1, and with hydraulic pressure being applied from pump P through the pipe 10, and the valve body 11 to clutch C, some fluid will tend to move from pressure pipe 13 through the passage 27 into the bypass valve body 25 and through the central passage 32 of shuttle valve 28, passage 26 and to the passage 19. From the passage 19, the fluid will obviously flow into the chamber 20 of the valve body 11, past spool 12 and to the low-pressure side of the hydraulic system at reservoir R.

In other words, some of the fluid pressure transmitted by the valve spool 12 to the clutch C will be dissipated through the bypass contributed by the valve body 25. This will naturally mean that it will be impossible to apply full hydraulic pressure to the clutch C by sudden movement of the valve spool 12 to its position in FIG. 1. In order to prevent continuous dissipation of hydraulic pressure at valve 25, a condition that is not desirable, the passage 32 of shuttle valve 28 is so formed that fluid flowing through the passage 27 will gradually move the shuttle valve from its central balanced position into a position in which it will close the passage 26. This relationship of the parts will be best understood by reference to FIG. 2 where the fluid flow to clutch C is reversed from that of FIG. 1. Thus, in FIG. 2 it will be noted that the valve spool 12 has been moved into a position in which fluid flowing into the valve body 11 through pipe 10 will be directed into the pipe 19 toward the clutch C and incidentally valve body 25. The fluid will be applied to the passage 26 of valve body 25 against the shuttle valve 28, and after some dissipation of fluid through the passage 32, the shuttle valve will move to its end position shown in FIG. 2 and will prevent any further dissipation by flow through the passage 27 into the pipe 13 and toward the valve body 11.

Figure 3:
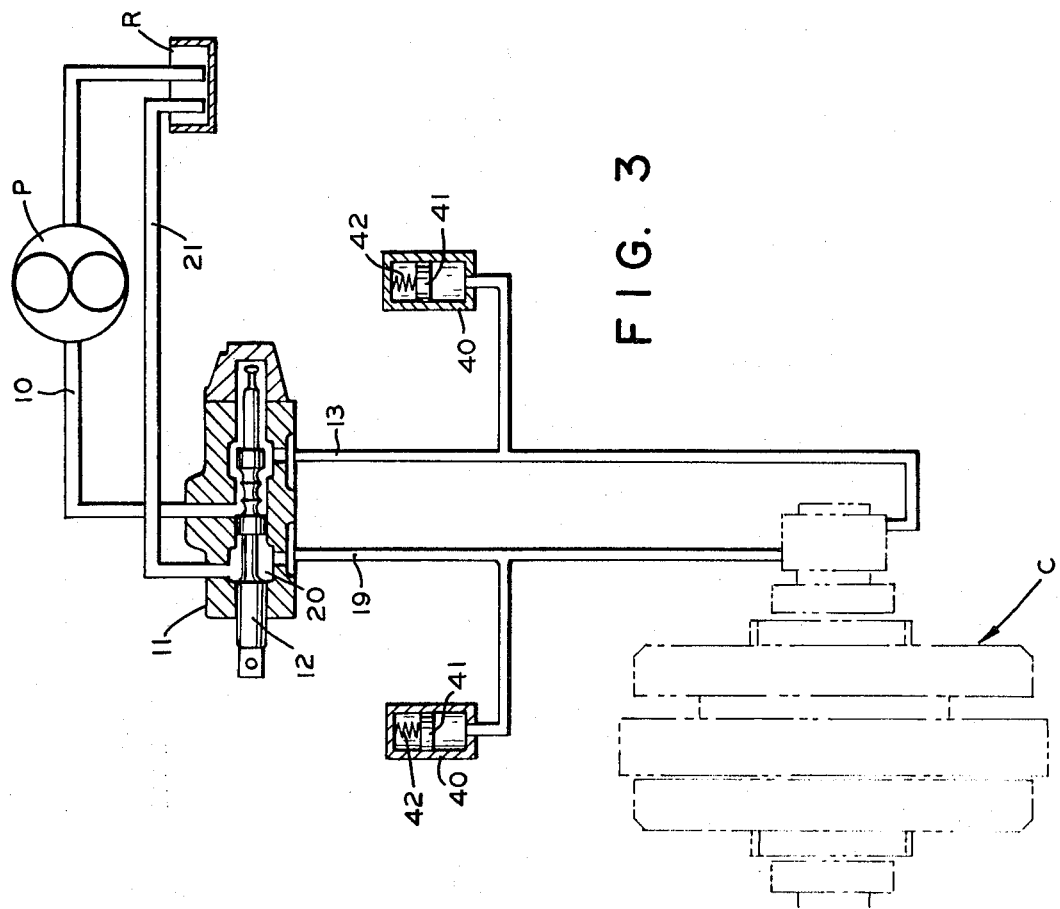
FIG. 3 is a view similar to FIGS. 1 and 2 but illustrating a second modification in which the fluid pressure to either of the clutches is somewhat dampened or dissipated by an accumulator.

Referring now to FIG. 3, I illustrate that modification utilizing the concept of my invention in which an accumulator is connected into each of the passages 13 and 19. Thus, connected into the passage 13 is an accumulator 40 having a piston 41 maintained under pressure by a spring 42. Obviously, any application of pressure in the pipe 13 will act to move piston 41 upwardly, so that there will be a relief of the pressure in the passage 13 and no sharp application of pressure to the clutch C. The accumulator shown in FIG. 3 connected to the pipe 19 is exactly the same as that shown connected to the pipe 13 and will function in the same manner. Of course, those skilled in the art will appreciate that I have shown only the most rudimentary type of accumulator, and that it will be possible to use many forms of accumulators known to the art.

Referring now to FIG. 4, I shall describe the third modification of my invention in which the bypass passage through which fluid is dissipated from the pressure side to the low pressure side of the pressure source is created by a cutting away of a gasket. The directional valve body 50 in FIG. 4 is essentially the same as valve body 11, and is shown formed with a part 51 which is suitably assembled relatively thereto with a gasket 52 therebetween. Thus, fluid will flow from the chamber in which the spool 12 is mounted for movement into the pipe 13 or the pipe 19, depending upon the direction in which the vehicle is required to move. Gasket 52, shown in FIG. 5, will be utilized to prevent leakage between parts 50 and 51. Gasket 52 has an opening 54 in alignment with the pipe 13 and an opening 55 in alignment with the pipe 19. Under the concept of my invention, the gasket 52 will be cut away as shown at 56 in FIG. 6 forming a novel gasket 53. It is obvious that any movement of fluid under pressure either through pipe 13 or through pipe 19 will be dissipated through the bypass passage 56. This will prevent a sharp buildup of hydraulic pressure at clutch C. Of course, as the engine is speeded, it moves the pump P more and more swiftly, and the increased fluid pressure will, despite the fluid dissipated through the passage 56, actuate the clutches.

I believe that those skilled in the art will now appreciate that my invention provides an extremely simple means for dissipating the fluid pressure flowing to the clutch C, either through use of a cross passage through a gasket, a cross passage through a valve body with means for limiting the amount of dissipation, and the use of an accumulator for accepting high pressures and dissipating those high pressures.

I now claim:

1. In a transmission having forward and reverse clutches actuated by the application of fluid pressure thereto, first and second fluid passage means connecting each of said clutches to a source of fluid pressure, and a directional valve interposed in said fluid passage means between said clutches and said source of fluid pressure, the improvement comprising damping means functionally between said clutches and valve to control the rate of application of fluid pressure to said clutches, said damping means comprising cross passage means connecting said first and second fluid passage means and formed in a gasket separating two pieces of a valve body through which fluid flows to said clutches.

2. In the combination of claim 1, the feature that said gasket is cut away from an opening in the gasket in communication with one passage to an opening in the gasket in communication with the other passage.

3. In the combination of claim 1, the feature that said fluid pressure source is a pump driven by an engine to which the transmission is applied whereby increased speed of the engine gradually overcomes the dissipation of fluid through said cross passage in the gasket.

* * * * *